United States Patent
Grimes et al.

(10) Patent No.: US 10,591,094 B1
(45) Date of Patent: Mar. 17, 2020

(54) REPLACEABLE UNION NUT

(71) Applicant: The United States of America, as represented by the Secretary of the Navy, Arlington, VA (US)

(72) Inventors: Keith R. Grimes, Hatboro, PA (US); Nuri N. Bracey, Philadelphia, PA (US)

(73) Assignee: The United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 15/176,820

(22) Filed: Jun. 8, 2016

(51) Int. Cl.
F16L 19/02 (2006.01)
F16L 55/18 (2006.01)

(52) U.S. Cl.
CPC ............... *F16L 19/02* (2013.01); *F16L 55/18* (2013.01)

(58) Field of Classification Search
CPC ............ F16L 19/02; F16L 19/00; F16L 55/18
USPC .......................................... 285/16, 330, 913
See application file for complete search history.

(56) References Cited

U.S. PATENT DOCUMENTS

| | | | |
|---|---|---|---|
| 918,078 A * | 4/1909 | McCaffrey | F16D 1/06 403/344 |
| 1,405,342 A * | 1/1922 | Shaffer | F16D 1/08 403/344 |
| 1,547,759 A * | 7/1925 | Journeay | E21B 17/046 279/100 |
| 1,982,183 A * | 11/1934 | Tarbox | F16G 11/10 24/122.6 |
| 2,890,066 A * | 6/1959 | Kerr | F16L 37/138 285/298 |
| 3,643,986 A * | 2/1972 | Allan | F16L 41/06 285/197 |
| 5,524,936 A * | 6/1996 | Barr | F16L 19/02 285/328 |
| 2012/0144641 A1* | 6/2012 | Minato | F04F 5/54 29/402.12 |
| 2014/0130580 A1* | 5/2014 | McAdams | G01N 30/00 73/61.52 |

* cited by examiner

*Primary Examiner* — Anna M Momper
*Assistant Examiner* — Fannie C Kee
(74) *Attorney, Agent, or Firm* — Mark J. Rosen

(57) ABSTRACT

A two-piece replaceable union nut for repairs on shipboard high pressure air systems. The replacement union nut is employed when an existing union nut has failed (i.e. cracked or broken) or has been identified as sub-standard due to material type or some other shortcoming, but the piping, tailpiece and thread piece are still in satisfactory condition. The two pieces fit around the pipe and mate using machined notches to form a complete union nut that is constrained in all directions and dimensionally equivalent to a standard union nut. The two-piece union nut facilitates replacement of a union nut in service without the need for cutting piping and reattaching the accompanying tailpiece, and testing the system as conventionally required.

8 Claims, 1 Drawing Sheet

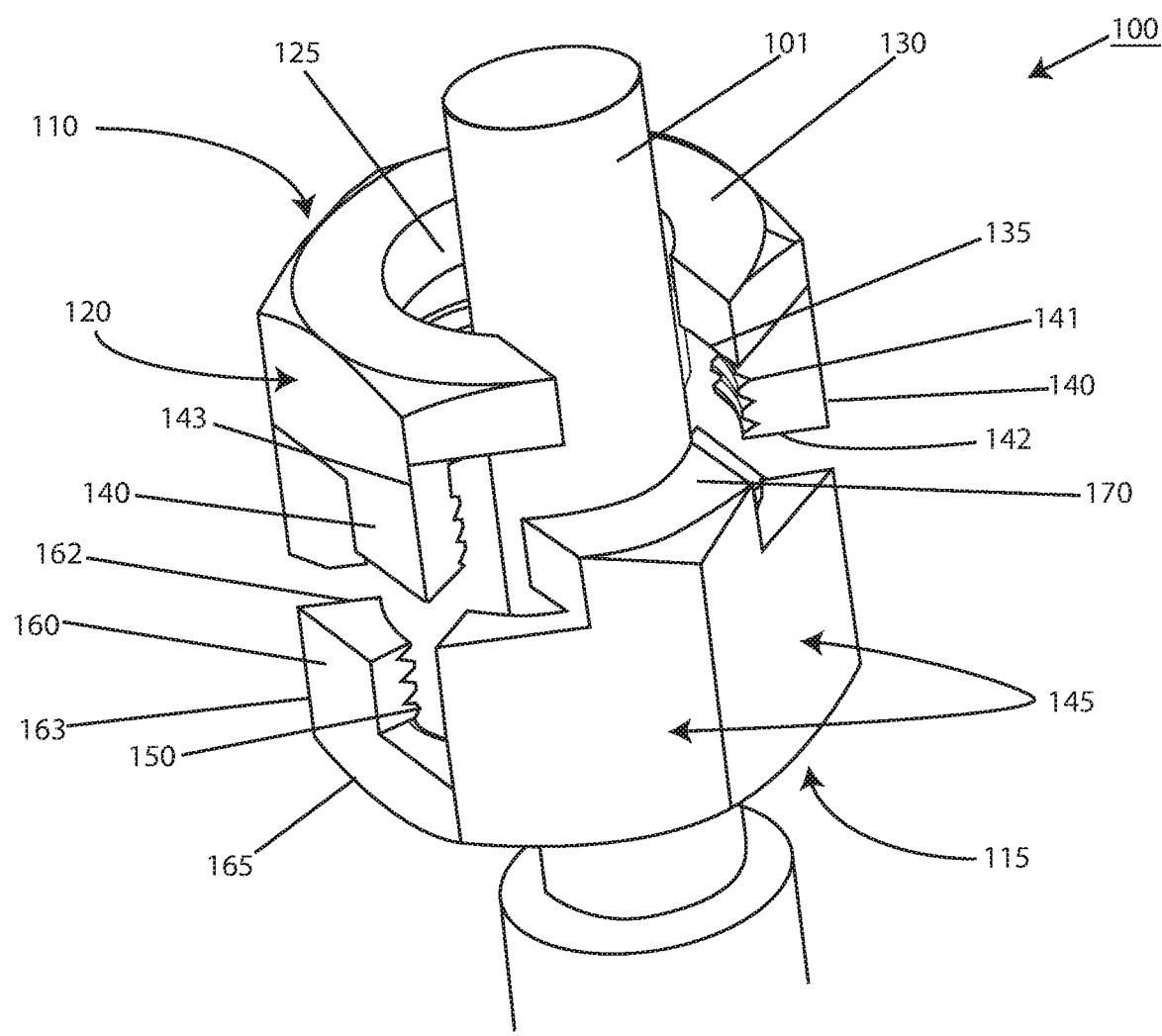

REPLACEABLE UNION NUT

STATEMENT OF GOVERNMENT INTEREST

The invention described herein may be manufactured and used by, or for the Government of the United States of America, for governmental purposes without payment of any royalties thereon or therefore.

BACKGROUND

Conventional union nuts are permanently installed on pipes after the piping tailpieces are in place. In high pressure air systems, particularly on military ships, union nuts are used throughout the system (numbering in the hundreds) to secure mechanical joints. These shipboard high pressure air systems are often subject to changes in temperature and humidity. Shipboard air systems also have an operating pressure of over three thousand pounds per square inch. Union nuts need to be resilient to these changes. Historically, military vessel air systems have been outfitted with union nuts manufactured from either stainless steel or nickel aluminum bronze. However, in newer installations, silicon aluminum bronze is used. Silicon aluminum bronze, due to its metallurgical structure, has a lower corrosion resistance, making it more susceptible to failure in high humidity, high pressure environments. Consequently, it can be sub-standard material for some extreme environments. On many Navy vessels, the high pressure, high temperature, high humidity environment has caused silicon aluminum bronze union nuts to corrode, crack and split. These union nuts, and others that have been identified as susceptible to failure, need to be replaced to maintain the integrity and safety of the ship's high pressure air system.

Conventionally, replacing the union nut required cutting the pipe to remove the failed union nut, repairing or replacing the pipe and tail piece, and installing a new union nut, even when the pipe and tailpiece were undamaged. This repair and replacement is costly, time consuming and labor intensive. Replacing pipe and tailpiece requires "hot work," such as welding or brazing. Then, subsequent system cleaning, flushing, testing, and inspections are required. Consequently, what is needed is a more convenient and effective method for replacing failed or sub-standard union nuts without having to cut out and replace sections of pipe and conduct all of the associated tests and inspections of the system.

SUMMARY

The invention is a two-piece union nut designed to replace a compromised or sub-standard union nut without having to replace the entire section of pipe where the union nut was used. The two piece union nut comprises a top half and a bottom half that are designed fit around a given section of pipe and mate together for a complete union nut. The top and bottom halves are machined with a cutout portion to fit around the pipe and notches that mate seamlessly to form a union nut. When the two halves are combined, the union nut is constrained in all directions. In addition, the threads on the inner surface of each half line up and maximize thread coverage on the pipe thread piece.

The replaceable union nut minimizes labor and reduces cost. With the replaceable union nut, the only hot work required is that of cutting the failed union nut from the pipe, which does not affect system integrity or cleanliness. The replaceable union nut can be installed without any special tools. Instead, it is installed by simply connecting the two halves together around the pipe and threading it into place using standard tools. Once the new nut is installed, there is no need to clean, flush or hydrostatically test the system. System integrity and cleanliness are preserved allowing the system to be put back into use immediately.

DRAWINGS

FIG. 1 is an expanded view of an embodiment of the replaceable union nut.

DETAILED DESCRIPTION

FIG. 1 shows an embodiment of the replaceable union nut (100) for repairing a pipe (101). The replaceable union nut (100) has a top half (110) and a bottom half (115). The top half (110) has a partial hexagonal outer surface (120) and a partial cylindrical inner surface (125). The flat end (130) of the top half (110) has a cutout portion (135) that accommodates the pipe (101). The opposite end of the top half (110), is machined with notches (140). The union nut of the present invention can be manufactured to accommodate any sized pipe while maintaining its structural integrity.

Likewise the bottom half (115) has a partial hexagonal outer surface (145) and a partial cylindrical inner surface (150). The first end of the bottom half (115) has notches (160). The second flat end (165) of the bottom half has a cutout portion (on the opposite side of the pipe (101)). The pipe (101) fits through the cutout portion (135) of the first, flat end (130) of the top half (110) and the cutout portion (on the opposite side of the pipe) of the second flat end (165) of the bottom half (115).

The cutout portion (135) of the first flat end (130) of the top half (110) is comprised of two parallel cuts, centered on a corner of the partial hexagonal outer surface (120), and separated by a distance wide enough to accommodate the outside diameter of the pipe (101). The first end (170) of the bottom half (115) contains a protrusion centered on a corner of the partial hexagonal outer surface (145), with parallel sides made to fit inside the parallel cuts of the top half (110).

The cutout portion (on the opposite side of the pipe (101)) of the second flat end (165) of the bottom half (115) is made with cuts on corners of the partial hexagonal outer surface (145) extending in towards the centerline of the diameter of the partial cylindrical inner surface (150). The second flat end (165) of bottom half (115) contains four sides of the partial hexagonal outer surface (145). The second end of the top half (110) contains a protrusion on two sides of the hexagonal outer surface (120). When, the top half and bottom half (115) are mated, the second end of the top half (110) and the second flat end (165) of the bottom half (115) form the full hexagonal outer surface of the complete union nut.

When assembled to form a complete union nut, the first flat end (130) of the top half (110) and the first end (170) of the bottom half (115) contain a bore to accommodate a tailpiece which is concentric with an inner diameter of the complete union nut. Also, the partial cylindrical inner surface (150) of the bottom half (115) forms a full cylinder with internal threads (141) for tightening the union nut onto a thread piece of the pipe being repaired.

The threads on the partial cylindrical inner surface (125) of the top half (110) lineup with threads on the partial cylindrical inner surface (150) of the bottom half (115) to form one smooth, continuous helix. Consequently, when the complete union nut is tightened onto a thread piece, the top half (110) holds down the bottom half (115).

To form the complete union nut, the notches (140) on the second end of the top half (110) mate with the notches (160) on the first end of the bottom half and fill the cutout portion (135) in the first flat end (130) of the top half (110) and the cutout portion (on the opposite side of the pipe (110)) in the second flat end (165) of the bottom half (115) to form a complete union nut, with a full cylindrical inner surface.

The vertical lines (143) of the notches (140) on the second end of the top half (110) and the vertical lines (163) of the notches (160) on the first end of the bottom half (115) start halfway in on the two adjacent flat sides and on the corners of the partial hexagonal outer surface (120) of the top half (110) and on the partial hexagonal surface (145) of the bottom half (115) and extend radially toward a center line of the partial cylindrical inner surface (125) of the top half (110) and toward the partial cylindrical inner surface (150) of the bottom half (115).

The horizontal lines (142) of the notches (140) on the second end of the top half (110), and the horizontal lines (162) of the notches (160) on the first end of the bottom half (115) are located at the maximum thread depth of the internal threads on the cylindrical inner surface (125) of the top half (110) and the cylindrical inner surface (150) of the bottom half (115).

Also, the horizontal lines (142) of the notches (140) on the second end of the top half (110) and horizontal lines (162) of the notches (160) on the first end of the bottom half (115) are located at one half of the maximum thread depth of the internal threads on the cylindrical inner surface of the completed union nut. The cuts and the placement of the notches, along with the alignment of the threads, maximize thread coverage on the thread piece by the complete union nut. Also, when the two halves are mated, the completed union nut is constrained in every direction except upwards from the top half (110) of the union nut.

In the preferred embodiment, the replaceable union nut is machined from stainless steel, nickel aluminum bronze or nickel copper. However, the union nut can be machined from a variety of composite materials or metals.

Although the invention has been described in detail with particular reference to preferred embodiments, other embodiments can achieve the same results. Variations and modifications of the present invention will be obvious to those skilled in the art and it is intended to cover, in the appended claims, all such modification and equivalents. The entire disclosure and all references, applications, patents and publications cited above are hereby incorporated by reference.

What is claimed is:

1. A replaceable, two-piece union nut for repairing a pipe comprising:
   a top half comprising:
      a partial hexagonal outer surface;
      a partial cylindrical inner surface;
      a first flat end with a cutout portion; and
      a second end, opposite the first flat end, with notches; and
   a bottom half comprising:
      a partial hexagonal outer surface;
      a partial cylindrical inner surface;
      a first end with notches; and
      a second flat end, opposite the first end, with a cutout portion,
   wherein when the top half and the bottom half are combined, the two-piece union nut is constrained in all directions except upwards from the top half, and wherein the notches on the second end of the top half mate with the notches on the first end of the bottom half and fill the cutout portion of the first flat end of the top half and the cutout portion of the second flat end of the bottom half to form a complete union nut, with a cylindrical inner surface having internal threads in the form of a continuous helix for tightening the union nut onto a thread piece, and wherein the complete union nut accommodates a tailpiece.

2. The replaceable two-piece union nut of claim 1, wherein when the complete union nut is tightened onto a thread piece, the complete union nut is constrained in all directions.

3. The replaceable, two-piece union nut of claim 1, wherein vertical lines of the notches on the second end of the top half and vertical edge lines of the notches on the first end of the bottom half start halfway in on two adjacent flat sides and on corners of the partial hexagonal outer surface of the top half and the partial hexagonal surface of the bottom half and extend radially toward a center line of the partial cylindrical inner surface of the top half and the partial cylindrical inner surface of the bottom half.

4. The replaceable, two-piece union nut of claim 1, wherein horizontal edge lines of the notches on the second end of the top half and horizontal edge lines of the notches of the first end of the bottom half are located at a maximum thread depth of the internal threads on the partial cylindrical inner surface of the top half and the partial cylindrical inner surface of the bottom half to maximize thread coverage on the thread piece by the complete union nut.

5. The replaceable, two-piece union nut of claim 4, wherein the horizontal edge lines of the notches on the second end of the top half and the horizontal edge lines of the notches on the first end of the bottom half are located at one half of the maximum thread depth of the internal threads on the cylindrical inner surface of the completed union nut to maximize thread coverage on the thread piece by the complete union nut.

6. The replaceable union nut of claim 1, wherein the cutout portion of the first flat end of the top half comprises two parallel cuts, centered on a corner of the partial hexagonal outer surface, and separated by a distance wide enough to accommodate an outside diameter of the pipe being repaired, and
   wherein the first end of the bottom half contains a protrusion centered on a corner of the partial hexagonal outer surface, with parallel sides made to fit inside the two parallel cuts of the top half, and
   wherein when assembled to form a complete union nut, the first flat end of the top half and the second flat end of the bottom half contain a bore to accommodate a tailpiece which is concentric with an inner diameter of the complete union nut.

7. The replaceable union nut of claim 1, wherein the cutout portion of the second flat end of the bottom half is made with cuts on corners of the partial hexagonal outer surface extending in towards a centerline of a diameter of the partial cylindrical inner surface, and
   wherein the second flat end of bottom half contains four sides of the partial hexagonal outer surface, and
   wherein the second end of the top half contains a protrusion with two sides of the hexagonal outer surface, and
   wherein, when the top half and bottom half are mated, the second end of the top half and the second flat end of the bottom half create a complete union nut.

8. The replaceable union nut of claim 1, wherein the top half and the bottom half are machined from stainless steel, nickel aluminum bronze or nickel copper.

\* \* \* \* \*